(12) United States Patent
Han

(10) Patent No.: US 9,958,900 B2
(45) Date of Patent: May 1, 2018

(54) COVER WINDOW AND MANUFACTURING METHOD OF THE SAME

(71) Applicant: Samsung Display Co., Ltd., Yongin, Gyeonggi-Do (KR)

(72) Inventor: Sang-Woo Han, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 881 days.

(21) Appl. No.: 14/047,201

(22) Filed: Oct. 7, 2013

(65) Prior Publication Data

US 2014/0353874 A1 Dec. 4, 2014

(30) Foreign Application Priority Data

Jun. 4, 2013 (KR) .................. 10-2013-0064333

(51) Int. Cl.
*G06F 1/16* (2006.01)
*B29C 45/14* (2006.01)
*B29L 31/34* (2006.01)
*B29C 45/00* (2006.01)

(52) U.S. Cl.
CPC ...... *G06F 1/1626* (2013.01); *B29C 45/14811* (2013.01); *G06F 1/1637* (2013.01); *B29C 45/0046* (2013.01); *B29C 2045/14844* (2013.01); *B29K 2995/0026* (2013.01); *B29K 2995/0098* (2013.01); *B29L 2031/3437* (2013.01); *Y10T 428/23* (2015.01)

(58) Field of Classification Search
CPC .... B32B 1/00; B32B 3/02; B32B 3/04; G06F 1/1626; G06F 1/1637; B29C 2045/14844; B29C 45/0046; B29C 45/14811; B29L 2031/3437; B29K 2995/0026; Y10T 428/24777; Y10T 428/2419
See application file for complete search history.

(56) References Cited

U.S. PATENT DOCUMENTS

| | | | | |
|---|---|---|---|---|
| 2009/0009941 A1* | 1/2009 | Hsu | .................. | B29C 45/14811 361/679.27 |
| 2009/0301748 A1* | 12/2009 | Hsu | .................. | B29C 45/14811 174/50 |
| 2010/0159183 A1 | 6/2010 | Nishimura | | |
| 2010/0260971 A1* | 10/2010 | Chang | ................. | B29C 37/0032 428/141 |
| 2010/0279043 A1* | 11/2010 | Hsu | .......................... | B05D 5/06 428/35.7 |
| 2011/0318591 A1* | 12/2011 | Wu | .................... | B29C 45/14467 428/464 |
| 2013/0029084 A1 | 1/2013 | Rhyu et al. | | |

FOREIGN PATENT DOCUMENTS

| | | |
|---|---|---|
| JP | 2009166372 A | 7/2009 |
| KR | 1020100027109 A | 3/2010 |
| KR | 1020110071936 A | 6/2011 |
| KR | 1020130013767 A | 2/2013 |

* cited by examiner

*Primary Examiner* — Catherine A Simone
(74) *Attorney, Agent, or Firm* — Cantor Colburn LLP

(57) ABSTRACT

A cover window and a method of manufacturing the cover window include a film layer and a resin layer disposed on the film layer to surround an edge of the film layer.

8 Claims, 3 Drawing Sheets

COVER WINDOW AND MANUFACTURING METHOD OF THE SAME

This application claims priority to Korean Patent Application No. 10-2013-0064333, filed on Jun. 4, 2013, and all the benefits accruing therefrom under 35 U.S.C. §119, the content of which in its entirety is herein incorporated by reference.

BACKGROUND

1. Field

The embodiments described herein relate to a cover window and a manufacturing method of the same.

2. Description of the Related Art

Mobile-based electronic devices are increasingly being used over office based electronic devices. Examples of mobile electronic devices may include, for example, but not limited to, tablet personal computers ("PCs") that have become widely used in recent years over using laptop PCs. Further examples also include small electronic devices, such as mobile phones and the like.

Such mobile electronic devices typically include a display unit to provide visual information to a user. Such visual information, including images or videos often support various functions of the mobile electronic device to which the display unit is a part thereof. Recently, as other components for driving a display unit have become miniaturized, the display unit is the primary interface between the user and the mobile electronic device. Furthermore, a display unit which is bendable from a flat state at a predetermined angle is being developed. Thus, the display unit of a mobile electronic device as described above may be flexible.

A cover window may be attached to an outer surface of the display unit to protect an exterior of the display unit. The cover window may be formed of various materials. For example, the cover window may be formed of a glass material or a synthetic resin. The cover window may also be injection-molded using a synthetic resin material; however, a disadvantage of this manufacturing method is that the cover window may become delaminated after manufacturing, thereby causing defects thereof.

SUMMARY

Exemplary embodiments of the exemplary embodiment provide a cover window and a manufacturing method of the same. The manufacturing method is capable of reducing the occurrence of delamination of each layer comprising the cover window.

According to an exemplary embodiment of the invention, a cover window is provided which includes: a film layer; and a resin layer disposed on the film layer which surrounds an edge of the film layer.

At least one portion of the film layer and at least one portion of the resin layer may be bent.

The film layer may have an area that is less than the area of the resin layer.

The film layer may be formed of the same material as the resin layer.

The film layer may further include a film body and a shielding layer disposed on at least one portion of the film body.

The resin layer may further include a body part and a supporting part extending therefrom to surround the edge of the film layer.

The cover window may further include a protection layer disposed on at least one portion of the film layer to face the resin layer which surrounds the edge of the film layer.

The resin layer may surround an edge of the protection layer and the edge of the film layer.

The protection layer may be disposed on at least one portion of the resin layer surrounding the edge of the film layer and at least one portion of the film layer.

The cover window may further include a binder layer disposed between the film layer and the resin layer.

At least two of the following layers may be formed of the same material: the film layer, the resin layer, or the binder layer The resin may be injection-molded on the film layer through an in-mold-labeling ("IML") process to manufacture the resin layer.

According to another aspect of the exemplary embodiment, a method of manufacturing a cover window is provided. The method includes bending at least one portion of the film layer, and injection-molding a resin on an outer surface of the film layer to form a resin layer surrounding an edge of the film layer.

The resin may be injection-molded through an IML process to form the resin layer.

The method may further include forming a protection layer on the film layer before bending at least one portion of the film layer to injection-mold a resin on an outer surface of the film layer.

The injection-molding of the resin may include injection-molding the resin to surround the edge of the film layer and an edge of the protection layer.

The method may further include: forming a protection layer on at least one portion of the film layer and at least one portion of the resin layer after the injection-molding of the resin on the film layer to form the resin layer.

The method may further include: forming a binder layer on the film layer before the bending of the at least one portion of the film layer.

The resin may be injected from the edge of the film layer toward a central portion of the film layer.

The edge of the film layer surrounded by the resin layer includes two opposing ends defining two opposing terminal ends of the thin film layer.

BRIEF DESCRIPTION OF THE DRAWINGS

The above and other features and advantages of the exemplary embodiment will become more apparent by describing in further detail exemplary embodiments thereof with reference to the attached drawings, in which.

DETAILED DESCRIPTION

Figure 1:
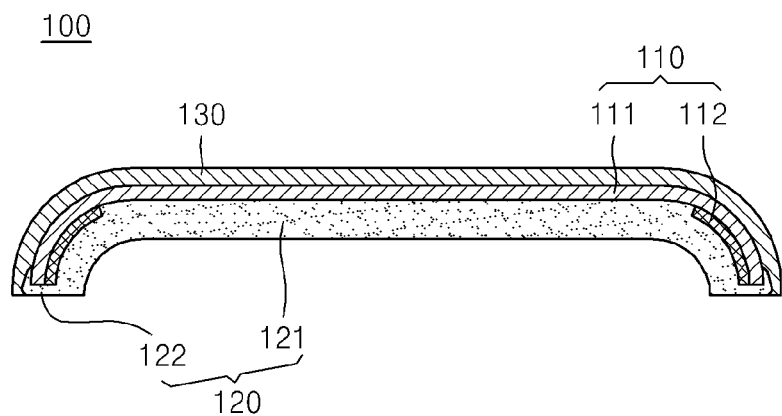
FIG. 1 is a conceptual cross-section view of an exemplary embodiment of a cover window in a width direction thereof, according to the present invention.

The present invention will be clarified through the following embodiments described with reference to the accompanying drawings.

The exemplary embodiments of the invention may be embodied in many different forms and should not be construed as being limited to the embodiments set forth herein. Rather, these embodiments are provided so that this disclosure will be thorough and complete and will fully convey the concept of the invention to those skilled in the art, and the exemplary embodiments of the invention will only be defined by the appended claims.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation can result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 2:
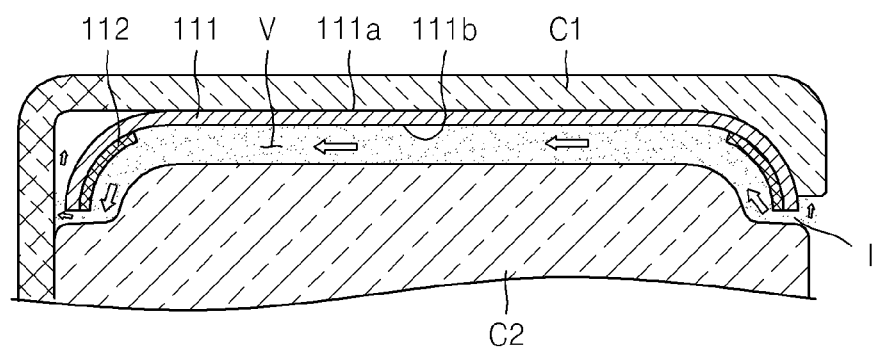
FIG. 2 is a conceptual cross-section view of an exemplary embodiment of a mold used for manufacturing the cover window of FIG. 1, according to the present invention.

According to an embodiment of the present invention, FIG. 1 is a cross-section view schematically illustrating a cover window in a width direction thereof. FIG. 2 is a conceptual cross-section view of a mold used for manufacturing the cover window of FIG. 1.

Referring to FIGS. 1 and 2, a cover window 100 may include a film layer 110. The film layer 110 may include a film body 111 and a shielding layer 112 disposed on at least one portion of the film body 111.

In an embodiment, the film body 111 may have at least one bent portion. In another embodiment, the film body 111 may be bent in various shapes. For example, the film body 111 may have a curved surface with a selected radius of curvature. In another embodiment, the film body 111 may have only one bent portion. For example, the film body 111 may have a flat shape except at an edge thereof. That is, only the edge of the film body 111 may be bent. Here, both side edges of the film body 111 may be bent. Alternatively, only one side edge of the film body 111 may be bent.

In an embodiment, the film body 111 may have a plurality of curved surfaces having different radii of curvature. In detail, the film body 111 may have a first curved surface having a first radius of curvature, a second curved surface having a second radius of curvature, a third curved surface having a third radius of curvature, . . . and an N-th curved surface having an N-th radius of curvature (where N is a natural number). In an embodiment, the first curved surface, the second curved surface, the third curved surface, . . . and the N-th curved surface may be connected to each other.

In particular, the film body 111 is not limited to the above described shapes. If at least one portion of the film body 111 is bent, the film body 111 may have various shapes.

At least one portion of the length direction and the width direction of the film body 111 may be a curved portion. In detail, the film body 111 may be bent in the length or width direction, or alternatively, the film body 111 may be bent in both length and width directions.

Hereinafter, for the convenience of description, the film body 111 of which only the edge is bent will be described in detail. In addition, for convenience of description, the film body 111 of which both side edges are bent in the width direction will be described in detail.

The film body 111 may be bent in various directions. Referring to FIG. 1, the film body 111 may have an upwardly convex shape. In an alternative embodiment of FIG. 1, the film body 111 may have a downwardly convex shape. However, hereinafter, for convenience in description, the film body 111 having the upwardly convex shape will be described in detail.

In an embodiment, the film body 111 may be formed of a transparent material. For example, the film body 111 may be formed of at least one of polymethylmethacrylate ("PMMA"), polycarbonate ("PC"), polyethylene terephthalate ("PET"), polyethylene terephthalate glycol ("PETG"), and acrylonitrile butadiene styrene. The material may be provided as a resin to form the film body 111. The film body 111 is not limited to the above-described materials and may include any injection-moldable transparent materials.

The shielding layer 112 may be manufactured by an inkjet printing process, a silk screen printing process, an imprinting process, or the like. Since the inkjet printing process, the silk screen printing process, the imprinting process, or the like are the same as a general process, detailed descriptions thereof will be omitted. The method of manufacturing the shielding layer 112 is not limited to the above-described methods. For example, the method may include any method of forming an opaque layer on the film body 111.

As described above, the shielding layer 112 may be disposed on at least one portion of the film body 111; in particular, the shielding layer 112 may be disposed on the edge of the film body 111.

The cover window 100 may include a resin layer 120 disposed on the film layer 110 to surround the edge of the film layer 110. The resin layer 120 may include a body part 121 and a supporting part 122 extending from the body part 121 to surround and cover the edge of the film layer 110.

The body part 121 may have the same shape as that of the film body 111. In particular, if at least one portion of the film body 111 is bent, at least one portion of the body part 121 may also be bent along the film body 111. The curved surface of the film body 111 may have a radius of curvature similar to that of the body part 121.

The body part 121 may be formed of a transparent material. For example, the body part 121 may include at least one of PMMA, PC, PET, PETG, or acrylonitrile butadiene styrene. The material may be in resin form to mold the body part 121. The body part 121 is not limited to the above-described materials and may include any injection-moldable transparent materials.

The body part 121 and the film body 111 may be formed of the same material or of different materials. In particular, if the body part 121 is formed of the same material as that of the film body 111, the body part 121 may be firmly coupled to the film body 111 through chemical bonding.

The supporting part 122 may be bent. In particular, the supporting part 122 may have a groove so that the film body 111 is inserted therein. The supporting part 122 may fix the edge of the film body 111 to prevent the edge of the film body 111 from being separated from the body part 121 or the supporting part 122.

The cover window 100 may include a protection layer 130 disposed on the film layer 110. The protection layer 130 may be disposed on the film layer 110 to face the resin layer 120. In particular, if the resin layer 120 is disposed on a first outer surface 111a of the film layer 110, the protection layer 130 may be disposed on a second outer surface 111b of the film layer 110, which is different from the first outer surface 111a. Also, if the resin layer 120 is disposed in the second outer surface 111b, the protection layer 130 may be disposed in the first outer surface 111a. However, for convenience of description, the protection layer being disposed on the first outer surface 111a and the resin layer 120 being disposed on the second outer surface 111b will be described in detail.

The protection layer 130 may be formed of a material having functions including, but not limited to, external force resistance, foreign substances resistance, and static electricity resistance. Particularly, the protection layer 130 may be formed of an acrylic material. Alternatively, the protection layer 130 may be formed of a composite layer including organic and inorganic materials. The protection layer 130 may be attached to the film layer 110 in a film shape and be formed through a coating process. However, for convenience of description, the protection layer which is manufactured by the coating process will be described in detail.

The protection layer 130 may be disposed on one portion of the resin layer 120 surrounding the edge of the film layer 110 and one portion of the film layer 110. In detail, the protection layer 130 may cover the body part 121 and the supporting part 122 to protect the body part 121 and a portion of the supporting part 122 against the outside.

In the method of manufacturing the cover window 100, the film layer 110 may be formed of the same material as the material described above. Here, the film body 111 may be disposed on the film layer 110, and then the shielding layer 112 may be disposed on at least one portion of the film body 111 through the inkjet printing process, the silk screening process, or the imprinting process, for example. Since the inkjet printing process, the silk screen printing process, and the imprinting process are well-known processes, detailed descriptions thereof will be omitted.

When the above-described process is finished, both sides of the edge of the film body 111 may be bent. Here, the film body 111 may be bent in various ways. For example, the film body 111 may be bent by being compressed or pressurized using a jig.

When the film body 111 is bent, the film body 111 may be disposed inside a mold (no reference character). The mold may include a first mold C1 and a second mold C2. The first mold C1 may be spaced apart from the second mold C2 to define a space V therebetween.

When the film body 111 is disposed in the space V, the first outer surface 111a of the film body 111 may be closely attached to a surface of the first mold C1. Here, a first outer circumferential surface of the first outer surface 111a of the film body 111 may be spaced apart from the surface of the first mold C1.

As described above, after the film body 111 is disposed, the resin may be injection-molded. The resin may be injection-molded on the film layer 110 by an in-mold-labeling ("IML") process to manufacture the resin layer 120. In particular, the resin may be injection-molded at a temperature of about 200° C. to about 300° C.

The resin may include at least one of PMMA, PC, PET, PETG, and acrylonitrile butadiene styrene which are materials for forming the resin layer 120.

When the resin is injected, the resin may be injected from the edge of the film body 111. In detail, the resin may be injected from the edge in a length direction of the film body 111 and from the edge in a width direction of the film body in a central direction of the film body 111. In particular, if the resin is injected from the edge of the film body 111 in the central direction of the film body 111, the cover window 100 may have a pattern formed due to a flow of the resin on an edge area of the film body 111. A pattern formed due to a flow of the resin on an edge area of the film body 111 is used to prevent deterioration of visibility or prevent defects from occurring when the display panel (not shown) is attached to the cover window 100.

As described above, when the resin is injection-molded, the resin may be introduced between the first mold C1 and the edge of the film body 111, and between the second mold C2 and the edge of the film body 111. Here, the resin may flow to surround the edge of the film body 111 by at least one of the first mold C1 and the second mold C2. In detail, the resin injected between the second mold C2 and the second outer surface 111b of the film body may flow toward a portion of the first outer surface 111a of the film body 111 along a side surface of the first mold C1. Also, the resin may flow from a resin injection hole I defined between the first mold C1 and the second mold C2 into a portion of the first outer surface 111a of the film body 111.

During the injection of the resin, if the film body 111 is formed of the same material as the resin, a portion of the material of the film body 111 may be fused according to the above described injection temperature to chemically bond the film body 111 to the resin. Thus, when the resin is cured to form the resin layer 120 after the resin is injected, the resin layer 120 may be firmly coupled to the film body 111 through the chemical bonding.

When the above-described process is finished, the temperature may decrease to cure the resin, thereby manufacturing the resin layer 120. Here, the resin layer 120 may have a surface area greater than that of the film layer 110. In detail, the resin layer 120 may have a length greater than that of the film layer 110 and a width greater than that of the film layer 110. Thus, the supporting part 122 may fully cover the edge of the film body 111.

When the above-described process is finished, the film layer 110 and the resin layer 120 may be taken out of the first mold C1 and the second mold C2. Also, the protection layer 130 may be disposed on the first outer surface 111a of the film layer 110. Here, the protection layer 130 may be manufactured through the coating process as described above. In detail, the protection layer 130 may be manufactured by alternately providing the acrylic material or the organic and inorganic materials through spraying or dip-coating, for example, but not limited thereto. Here, since the spraying and dip-coating are general well-known processes, detailed descriptions thereof will be omitted.

When the protection layer 130 is manufactured, the protection layer 130 may be disposed on the first outer surface 111a of the film body 111 and a portion of the supporting part 122. Here, the protection layer 130 may protect the first outer surface 111a of the film body 111 and the portion of the supporting part 122 against external forces, external foreign substances, and static electricity.

When the resin layer 120 is manufactured, the supporting part 122 may support the edge of the film body 111 as described above. In detail, if the edge of the film body 111 is bent, the edge of the film body 111 and the resin layer 120 may be separated from each other by a restoring force of the material forming the film body 111. Here, the supporting part 122 may be disposed to surround the edge of the film body 111 as described above, thereby preventing the edge of the film body 111 from being separated from the resin layer 120. If the film body 111 is deformed by heat, the supporting layer 122 may support the edge of the film body 111 to prevent the film body 111 and the resin layer 120 from being separated from each other.

Therefore, in the cover window 100 and the method of manufacturing thereof, the film body 111 and the resin layer 120 may be firmly coupled to each other to minimize defects of the cover window 100. Also, the method of manufacturing the cover window may be simplified to reduce working time and costs.

Figure 3:
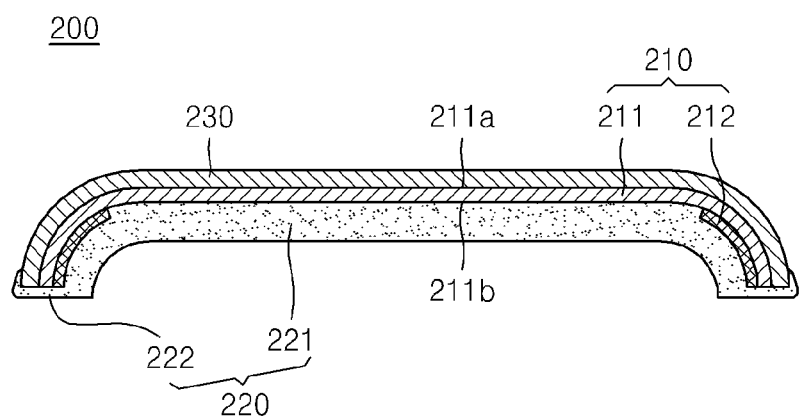
FIG. 3 is a conceptual cross-section view of an alternative exemplary embodiment of a cover window in a width direction thereof, according to the present invention.

FIG. 3 is a conceptual cross-section view of a cover window in a width direction thereof, according to an alternative embodiment of the present invention. Hereinafter, like reference numerals in FIGS. 1 and 2 denote like elements in FIG. 3.

Referring to FIG. 3, a cover window 200 may include a film layer 210, a resin layer 220, and a protection layer 230. The film layer 210 may include a film body 211 and a shielding layer 212. The resin layer 220 may include a body part 221 and a supporting part 222.

The film layer 210, the resin layer 220, and the protection layer 230 are respectively similar to the film layer 110, the resin layer 120, and the protection layer 130 in FIG. 1, and thus, a detailed description thereof will be omitted here.

The resin layer 220 may surround an edge of the film layer 210 and an edge of the protection layer 230. In detail, the supporting part 222 may surround the edge of the film layer 210 and the edge of the protection layer 230. Here, the supporting layer 222 may prevent the edge of the film layer 210 from being separated from the resin layer 220. In particular, the supporting part 222 may surround a second outer surface 211b of the edge of the film body 211 and a portion of the protection layer 230.

A method of manufacturing the cover window 200 may be similar to the method of manufacturing the cover window 100 of FIGS. 1 and 2 described above.

In detail, the film layer 210 may be manufactured and prepared. Here, the film body 211 may be manufactured through a process similar to the process described above. The shielding layer 212 may be manufactured by an inkjet printing process, a silk screen process, or an imprint process, for example. Here, since the inkjet printing process, the silk screen printing process, or the imprint process is the same as the general processes discussed above, detailed descriptions thereof will be omitted.

When the process is finished, the protection layer 230 may be disposed on a first outer surface 211a of the film body 211. The protection layer 230 may cover an entire surface of the first outer surface 211a of the film body 211.

When the protection layer 230 is disposed on the first outer surface 211a of the film body 211, the film body 211 and the protection layer 230 may be bent. Here, the film body 211 and the protection layer 230 may be bent by using a jig as described above in FIG. 2. The film body 211 and the protection layer 230 may be bent so that the film body 211 and the protection layer 230 have curved surfaces having various shapes. In particular, the edge of the film body 211 may be bent.

When the film body 211 and the protection layer 230 are bent, the film body 211 and the protection layer 230 may be disposed between a first mold C1 and a second mold C2. Here, a portion of an outer surface of the protection layer 230 may contact a surface of the first mold C1.

When the above-described process is finished, a resin may be injected between the second mold C2 and the second outer surface 211b of the film body 211. Here, as described above, the resin may be injected from the edge of the film body 211 toward a central direction of the film body 211.

When the resin is injected as described above, the resin may be introduced into a space (e.g., "V" in FIG. 2) between the film body 211 and the second mold C2. A portion of the resin may flow onto a portion of the protection layer 230 disposed on the first outer surface 211a of the film body 211. As time goes by, the resin may be cured to form the resin layer 220, thereby forming the body part 221 and the supporting part 222. In particular, the supporting part 222 may surround the bent edge of the film body 211 as described above. The supporting part 222 may cover a surface of the protection layer 230 disposed on the edge of the film body 211 (i.e., covering terminal edges defining opposing terminal ends of the protection layer 230).

While the resin is injected, if the film body 211 is formed of the same material as the resin, a portion of the film body 211 may be fused, and thus, chemically bonded to the resin layer 220.

Therefore, in the cover window 200 and the method of manufacturing thereof, the supporting part 222 surrounding the edge of the film body 211 and the portion of the supporting part 222 may be provided to prevent the bent edge of the film body 211 from being separated from the resin layer 220. In the cover window 200 and the method of manufacturing thereof, if the film body 211 is formed of the same material as the resin, the resin layer 220 and the film body 211 may be firmly coupled to each other due to chemical bonding therebetween.

Figure 4:
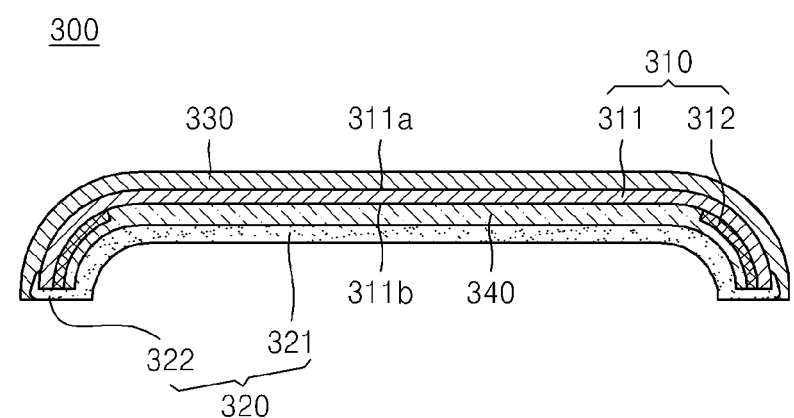
FIG. 4 is a conceptual cross-section view of another alternative exemplary embodiment of a cover window in a width direction thereof, according to the present invention.

FIG. 4 is a conceptual cross-section view of a cover window in a width direction thereof, according to another alternative embodiment of the present invention.

Referring to FIG. 4, a cover window 300 may include a film layer 310, a resin layer 320, and a protection layer 330. The film layer 310 may include a film body 311 and a shielding layer 312. The resin layer 320 may include a body part 321 and a supporting part 322.

The film layer 310, the resin layer 320, and the protection layer 330 are respectively similar to the film layer 110, the resin layer 120, and the protection layer 130 in FIG. 1, and thus, a detailed description thereof will be omitted.

The cover window 300 may include a binder layer 340 between the film layer 310 and the resin 320. The binder layer 340 may be formed on the film body 311 through a silk screen printing process. In detail, the binder layer 340 may be disposed on a second outer surface 311b of the film body 311. In particular, the binder layer 340 may have a surface area that is equal to or less than that of the film layer 310.

The binder layer 340 may be formed of various materials. For example, the binder layer 340 may include at least one of PMMA, PC, PET, PETG and acrylonitrile butadiene styrene. Here, the film layer 310, the resin layer 320, and the binder layer 340 may be formed of materials different from each other. Alternatively, at least two of the film layer 310, the resin layer 320, and the binder layer 340 may be formed of the same material. However, for convenience of description, the film layer 310, the resin layer 320, and the binder layer 340 which are formed of the same material will be described in further detail.

A method of manufacturing the cover window 300 may be similar to the method of manufacturing the cover window 200 described above with respect to FIG. 3.

In further detail, after the film body 311 is manufactured, the shielding layer 312 may be disposed on at least one portion of the film body 311. The shielding layer 312 may be manufactured by the inkjet printing process, the silk screen printing process, or the imprint process. Since the inkjet printing process, the silk screen printing process, or the imprint process are the same as the general processes described above, detailed descriptions thereof will be omitted.

When the process is finished, the film body 311 may be bent, and then inserted between the first mold C1 and the second mold C2 (shown in FIG. 2). Then, the resin may be injected between the second outer surface 311b of the film body 311 and the second mold C2 to dispose the resin layer 320 on the second outer surface 311b of the film body 311. When the resin is injected between the molds C1 and C2 as described above, the resin may fuse a portion of the binder layer 340 to chemically bond to a portion of the fused binder layer 340.

When the resin layer 320 is disposed as described above, the body part 321 and the supporting part 322 may be disposed as illustrated in FIG. 4, and the supporting part 311 may surround the edge of the film body 311. The supporting part 322 may prevent the film body 311 from being separated from the binder layer 340 due to an insertion of the edge of the film body 311 into the supporting part 322 of the resin layer 320.

When the process is finished, the protection layer 330 may be disposed on the first outer surface 311a of the film body 311. The method of disposing the protection layer 330 has been described already, and thus a detailed description thereof will be omitted.

Therefore, in the cover window 300 and the method of manufacturing thereof, although at least one portion of the cover window 300 is bent, the supporting part 322 may fix the edge of the film body 311 to the edge of the binder layer 340 to prevent the film body 311, the binder layer 340, and the protection layer 330 from being separated from each other.

Figure 5:
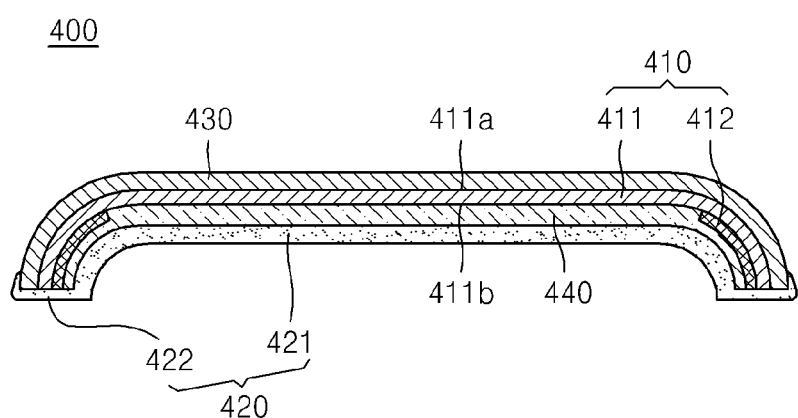
FIG. 5 is a conceptual cross-section of a yet another alternative exemplary embodiment of a cover window in a width direction thereof, according to the present invention.

FIG. 5 is a conceptual cross-section view of a cover window in a width direction thereof, according to yet another alternative embodiment of the present invention.

Referring to FIG. 5, a cover window 400 may include a film layer 410, a resin layer 420, a protection layer 430, and a binder layer 440. The film layer 410 may include a film body 411 and a shielding layer 412. The resin layer 420 may include a body part 421 and a supporting part 422.

The film layer 410, the resin layer 420, the protection layer 430, and the binder layer 440 are respectively similar to the film layer 310, the resin layer 320, the protection layer 330 and the binder layer 340 described in FIG. 4, and thus, a detailed description thereof will be omitted.

In the method of manufacturing the cover window 400, the shielding layer 412 may be disposed on the film body 411 as described above, and then the protection layer 430 may be disposed on a first outer surface 411a of the film body 411. A method of forming the protection layer 430 has been described above, and thus, a detailed description thereof will be omitted.

The binder layer 440 may be disposed on a second outer surface 411b of the film body 411. A method of disposing the binder layer 440 has been described above, and thus, a detailed description thereof will be omitted.

When the protection layer 430 and the binder layer 440 are disposed as described above, the film body 411 may be bent. A method of bending the film body 411 has been described above in detail, and thus, a detailed description thereof will be omitted.

The film layer 410, the protection layer 430, and the binder layer 440, which are bent, may be disposed between a first mold C1 and a second mold C2 as described above (and shown in FIG. 2), and then the resin may be injected.

Here, the resin may be injected from the edge of the film body 410 toward a central portion of the film body 410 as described above.

When the resin is injected between the molds C1 and C2 as described above, a portion of the resin may flow between the binder layer 440 and the second mold C2 to surround the edge of the film body 411 and a portion of the protection layer 430. Thereafter, when the resin is cured, the resin may form the resin layer 420.

Here, the edge of the film body 411, the edge of the binder layer 440, and the edge of the protection layer 430 may be inserted into the supporting part 422 of the resin layer 420 and thus be fixed by the supporting part 422. In particular, the supporting part 422 may prevent the bent edge of the film body 411 from returning to its original state, thus preventing the film body 411 from being separated from the binder 440. Also, the supporting part 422 may prevent the binder layer 440 from being moved together with the film body 411, thus preventing the binder layer 440 from being separated from the resin layer 420.

Therefore, in the cover window 400 and the method of manufacturing thereof, the returning of the edge of the film body 411 to its original state may be prevented and thus, the film body 411, the binder layer 440, and the resin layer 420 may be prevented from being separated from each other.

In particular, in the cover window 400 and the method of manufacturing thereof, the delaminating of the cover window 400 in the edge area thereof may be prevented and thus a defect rate is minimized.

According to embodiments of the present invention, the film layer and the resin layer may be firmly coupled to each other to minimize defects of the cover window. Also, according to embodiments of the present invention, the cover window may be manufactured more simply to reduce working time and costs thereof.

In particular, according to embodiments of the present invention, the resin layer may be formed to surround the edge of the bent film layer to prevent the film layer and the resin layer from being separated from each other.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cover window comprising:
    a film layer;
    a resin layer having a first major surface disposed on a first major surface defining the film layer wherein the resin layer surrounds an edge of the film layer, and a second major surface opposite the first major surface of the resin layer being exposed;
    a binder layer disposed between the film layer and the resin layer; and
    a protection layer disposed on at least one portion of a second major surface opposite the first major surface of the film layer,
    wherein the film layer, the resin layer and the binder layer are formed of a same material as each other.

2. The cover window of claim 1, wherein at least one portion of the film layer and at least one portion of the resin layer are bent.

3. The cover window of claim 1, wherein the film layer has a surface area that is less than that of the resin layer.

4. The cover window of claim 1, wherein the film layer comprises:
    a film body; and
    a shielding layer disposed on at least one portion of the film body.

5. The cover window of claim 1, wherein the resin layer comprises:
    a body part; and
    a supporting part extending from the body part wherein the supporting part surrounds the edge of the film layer.

6. The cover window of claim 1, wherein the resin layer surrounds an edge of the protection layer and the edge of the film layer.

7. The cover window of claim 1, wherein the protection layer is disposed on at least one portion of the resin layer surrounding the edge of the film layer and on at least one portion of the film layer.

8. The cover window of claim 1, wherein a resin is injection-molded on the film layer through an in-mold-labeling process to manufacture the resin layer.

* * * * *